(12) United States Patent
Reinhart

(10) Patent No.: US 6,893,560 B2
(45) Date of Patent: *May 17, 2005

(54) FILTER CONTAINER HAVING A MOUNTING PLATE FORMED OF SINTERED METAL

(75) Inventor: David Matthew Reinhart, Gaston, NC (US)

(73) Assignee: WIX Filtration Corp., Gastonia, NC (US)

( * ) Notice: Subject to any disclaimer, the term of this patent is extended or adjusted under 35 U.S.C. 154(b) by 140 days.

This patent is subject to a terminal disclaimer.

(21) Appl. No.: 10/273,257

(22) Filed: Oct. 18, 2002

(65) Prior Publication Data

US 2003/0038072 A1 Feb. 27, 2003

Related U.S. Application Data

(63) Continuation of application No. 09/777,883, filed on Feb. 7, 2001, now Pat. No. 6,468,425.

(51) Int. Cl.⁷ .................. B01D 27/08; B01D 35/30; B22F 3/24; B22F 3/20

(52) U.S. Cl. .................. 210/232; 210/440; 210/443; 419/7; 419/26

(58) Field of Search .................. 210/232, 440, 210/443, DIG. 17; 419/7, 26

(56) References Cited

U.S. PATENT DOCUMENTS

| | | | |
|---|---|---|---|
| 3,142,640 A | * | 7/1964 | Otto, Jr. .................. 210/136 |
| 4,052,307 A | | 10/1977 | Humbert, Jr. |
| 4,237,015 A | | 12/1980 | Fearnhead |
| 4,369,113 A | | 1/1983 | Stifelman |
| 4,443,404 A | * | 4/1984 | Tsuda et al. .................. 419/2 |
| 5,080,787 A | | 1/1992 | Brown et al. |
| 5,453,195 A | * | 9/1995 | Jorgenson et al. .......... 210/444 |
| 5,906,736 A | | 5/1999 | Bounnakhom et al. |
| 5,988,399 A | | 11/1999 | Brown et al. |
| 6,158,592 A | | 12/2000 | Reinhart et al. |
| 6,202,859 B1 | | 3/2001 | Langsdorf et al. |
| 6,230,900 B1 | | 5/2001 | Hara et al. |

* cited by examiner

*Primary Examiner*—Thomas M. Lithgow
(74) *Attorney, Agent, or Firm*—Liniak, Berenato & White

(57) ABSTRACT

Mounting plates used to mount filter elements within cylindrical canisters are made from sintered powdered materials, such as sintered powdered metal in order to reduce engineering and tooling lead time as well as to reduce costs. By making a mounting plate of sintered metal, the mounting plate can have a varying thickness which is an advantage not obtainable with a mounting plate stamped from steel sheet.

10 Claims, 3 Drawing Sheets

FILTER CONTAINER HAVING A MOUNTING PLATE FORMED OF SINTERED METAL

FIELD OF THE INVENTION

The present invention is directed to a filter container having a mounting plate made of sintered material. More particularly, the present invention is directed to a filter container for pressurized fluids, the filter container having a mounting plate made of sintered material.

BACKGROUND OF THE INVENTION

Filter containers for annular filter elements used to filter liquids such as hydraulic fluid, lubricating oil, and the like have mounting plates made of metal stampings for supporting annular filter elements. The metal stampings are usually made steel and require costly tooling which can not be provided quickly. Since the stamping are circular there is considerable waste which must be disposed of. Moreover, stampings limit mounting plates to plates of a constant thickness, which for high pressure applications frequently requires complex geometries in order to increase strength. Consequently, engineering and tooling efforts and as well costs for the mounting plates are relatively high and lead time for new designs is relatively long. In order to accommodate these limitations of stamped mounting plates, there is a tendency to avoid complex geometries, which geometries might be advantageous in configurations for filter mounting plates.

In view of these considerations, there is a need for a better way to configure mounting plates which does not have the disadvantages inherent in mounting plates configured by stamping.

SUMMARY OF THE INVENTION

The present invention is directed to a filter container having a filter element therein for supporting an annular filter media for filtering fluid used by a machine. The filter container comprises a cylindrical housing having a closed end and an open end. An annular mounting plate is positioned proximate the open end of the cylindrical housing and in accordance with the invention is molded of sintered metal and has a cross section of non-uniform thickness. The annular mounting plate supports the annular filter media thereon and has a central threaded opening therethrough for threadably coupling with a stand pipe of a machine using the fluid to be filtered. An annular cover is disposed over the annular mounting plate for holding the mounting plate in the housing, the cover being fixed to the housing at a peripheral portion of the housing.

In a further aspect of the invention, the mounting plate has unitary, spaced filter supports thereon defining channels therebetween, which channels allow fluid flow.

In still a further aspect of the invention, the spaced filter supports are lugs disposed adjacent the periphery of the plate and radially spaced from the threaded opening. And in still another aspect of the invention, the filter support are radially extending ribs.

In an additional aspect of the invention, the mounting plate includes a plurality of spaced holes therethrough, which are evenly spaced from the central opening to allow for circulation of fluid to or from the central opening after the fluid has passed through the filter media.

In still other aspects of the invention, the sintered metal is aluminum and weld projections are on the mounting plate to facilitate welding to the cover to the mounting plate.

BRIEF DESCRIPTIONS OF THE DRAWINGS

Various features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
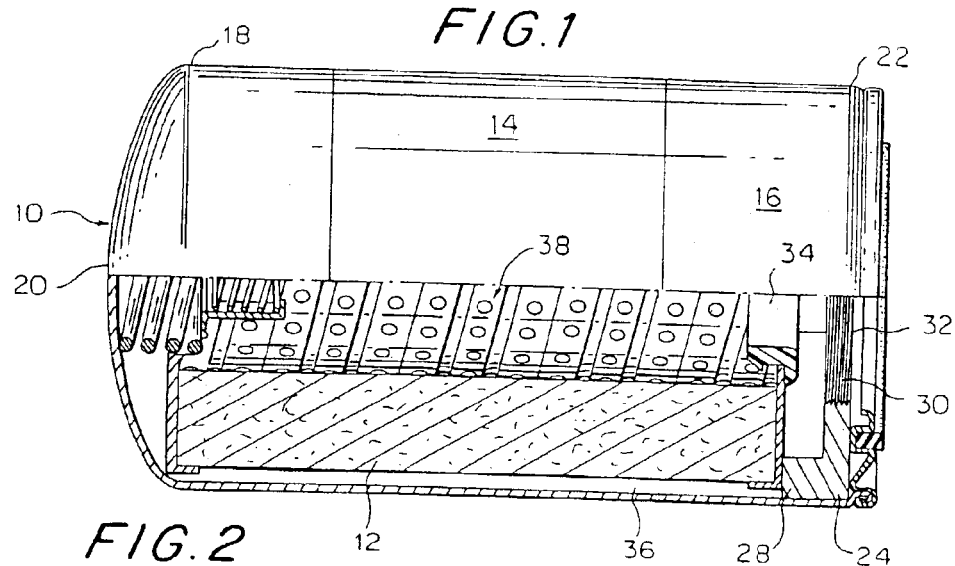
FIG. 1 is a side view, partially an elevation of the filter cartridge employing a mounting plate configured in accordance with the present invention.
Figure 2:
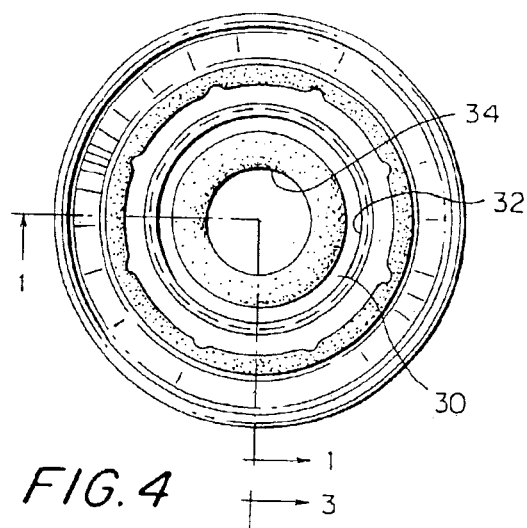
FIG. 2 is an end view of the filter cartridge of FIG. 1.
Figure 3:
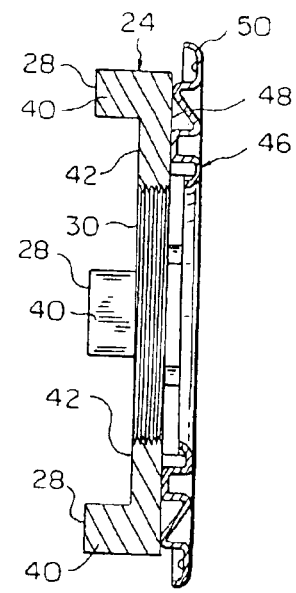
FIG. 3 is a side elevation of a mounting plate and cover used with the filter cartridge of FIGS. 1 and 2.
Figure 4:
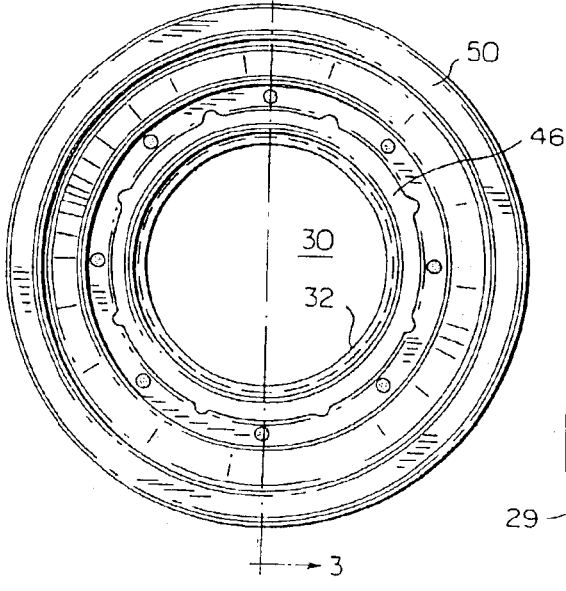
FIG. 4 is an end view of the mounting plate and cover shown in FIG. 3 with the cover positioned thereover.
Figure 5:
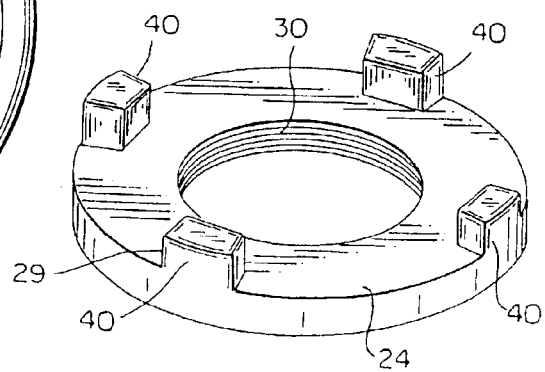
FIG. 5 is a perspective view of only the mounting plate shown in FIGS. 3 and 4.
Figure 6:
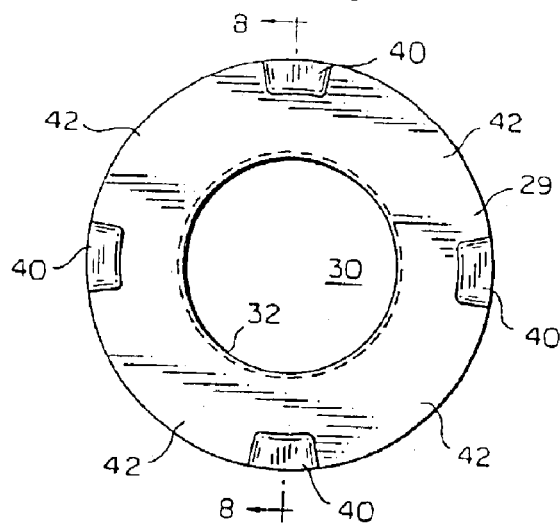
FIG. 6 is a planar view of one side the mounting plate of FIG. 5.

Referring now to FIGS. 1 and 2, and canister 10 encloses filter element 12 within a container 14, wherein the container 14 includes a cylindrical housing 16 having first end 18 closed by a dome 20 and a second end 22 in which is disposed an annular mounting plate 24 made of sintered material in accordance with the principals of the present invention. The filter element 12 is biased by a coil spring 26 into abutment with a filter support 28, which filter support is unitary with a substantially flat plate portion 29 of annular mounting plate 24.

The annular mounting plate 24 has a central opening 30 therethrough which has a helical thread 32 for receiving a conventional externally threaded stand pipe (not shown) of a hydraulic machine (not shown). The conventional threaded stand pipe includes a nipple (not shown) which is inserted within an eleastic glomet 34 in the filter element 12 to provide a liquid return. In operation, the liquid flows through openings within the stand pipe(not shown), past the filter supports 28 and into an annular space 36 before passing through the filter element 12 and into the core 38 of the filter element where it flows out through the nipple (not shown) of the stand pipe (not shown) sealed by the resilent gloment 34. In order to provide for this flow pattern of hydraulic fluid, the annular mounting plate 24 has the features set forth in FIG. 3-8.

Referring now to FIG. 3-8, it is seen especially in FIGS. 3, 5, 6 and 8 that the filter support 28 comprises lugs 40 which are unitary with the mounting plate 24 and are separated by spaces 42, the spaces 42 providing gaps through which oil can flow as it enters the filter cartridge 10 (FIG. 1) through the central opening 30 of the mounting plate 24.

Figure 7:
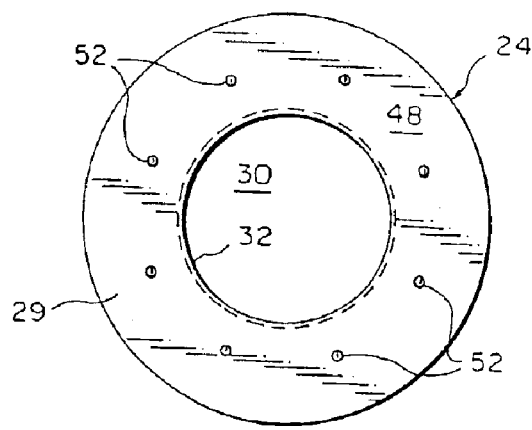
FIG. 7 is a planar view of the other side of the mounting plate of FIGS. 5 and 6.
Figure 8:
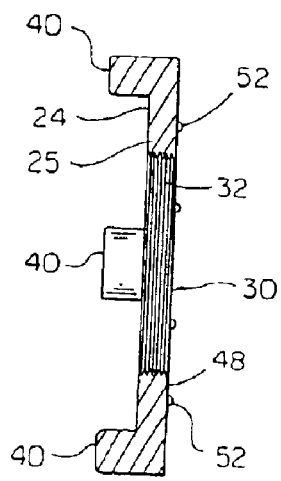
FIG. 8 is a side elevation of the mounting plate of FIG. 5-7 shown without the cover.

A cover 46 fits over the outwardly facing surface 48 of the mounting plate 24, the cover having a peripheral portion 50 which crimps with the second end 22 of the cylindrical housing 16. As is seen in FIGS. 7 and 8, the outwardly facing surface 48 of the mounting plate 24 has welding points 52 which provide a welding area so that the mounting plate 24 forms an assembly with the cover 46, which an assembly facilitates assemblage of the container 14 with the filter element 12 therein to form the filter cartridge 10. While welding points 52 are preferred, the cover 46 may be attached to the mounting plate 24 in other ways such as being crimped, press fit, bonded with adhesive or even screwed or bolted.

As is readily seen in FIG. 8, the mounting plate 24 does not have a constant cross section because the lugs 40 have a thickness in the axial direction which is greater than the thickness of the plate portion 29 of the mounting plate. In addition, the helical thread 32 is formed in the wall of the opening 30, while the projections 52 are formed on the surface 48. These are not structures which could not be formed by stamping a sheet metal plate since these structures do not have the same cross-sectional thickness in the axial direction as the plate portion 29. Moreover, it would be impossible to form the helical thread 32 by stamping. To accomplish the illustrated profile, the present invention forms the mounting plate 24 by sintering powdered metal. A preferable powdered metal is a powdered mixture of iron and copper. Other suitable powdered metal mixtures may be used, for example, powdered mixtures of iron including brass, bronze and stainless steel. Aluminum, which includes appropriate powdered oxides could be used, but may require a threaded steel insert for the helical thread 32. Parts made of sintered powdered aluminum have greater strength than parts made of cast aluminum or stamped from aluminum sheet. The mounting plate 24 may also be made of other sintered materials, such as but not limited to ceramic sintered materials or sintered powdered metals such as sintered steels which include for example iron carbon steel, iron copper steel, iron nickel steel or low alloy steel.

Figure 9:
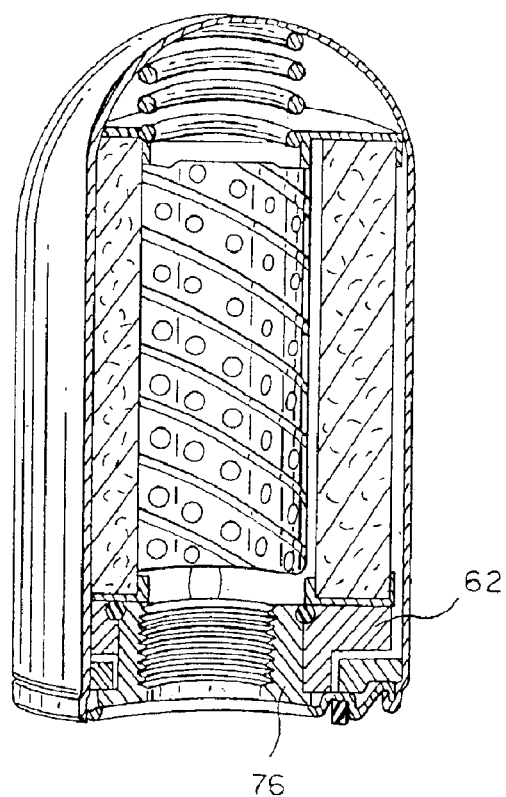
FIG. 9 is a side view in perspective with portions cut away of a second embodiment of a filter cartridge utilizing a filter container having a mounting plate configured in accordance with the principals of the present invention.
Figure 10:
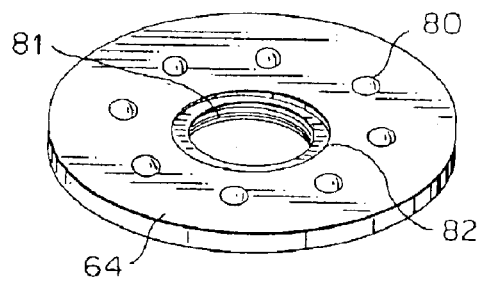
FIG. 10 is a perspective view of another embodiment of a mounting plate made of sintered metal in accordance with the principals of the present invention.
Figure 11:
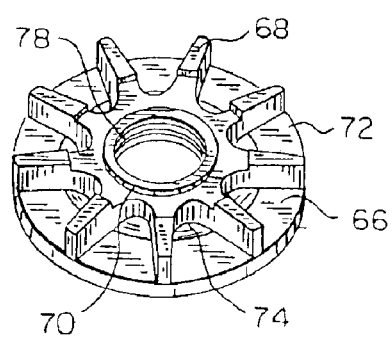
FIG. 11 is a perspective view of still another embodiment of a mounting plate made of sintered metal in accordance with the principles of the present invention.

Referring now to FIGS. 9, 10 and 11, there are shown mounting plates 62, 64 and 66, respectively, each made of sintered materials such as the preferred iron and copper powder mixtures or the other mixtures of this application as well as mixtures not mentioned. Note in FIGS. 9 and 11 that the mounting plates 62 and 66 do not have a uniform thickness and that the mounting plate of FIG. 11 has a complex geometry provided by ribs 68 of varying thickness and a hub 70 which is displaced from a ring portion 72 by a plurality of openings 74. It would be impossible to stamp the structure of FIG. 11 from a sheet of steel because of the varying thicknesses. Also note that in FIG. 9, the mounting plate 62 may have an internally threaded steel insert 76 and that the mounting plate 66 of FIG. 11 may have an internally threaded steel insert 78 if these mounting plates are made of aluminum. If the mounting plates are made of harder materials, the threaded inserts are formed during molding.

In FIG. 10, the mounting plate 64 has plurality of spaced small openings 80 and has a relatively uniform thickness except adjacent a central port 81 which has a raised rim 82. Again, there is shown in FIG. 10 a structure which cannot be stamped from a single sheet but can be molded of sintered metal.

The mounting plates 24, 62, 64 and 66 of FIGS. 5 and 9–11 are each formed by making molds of readily machinable or formed materials and then using the molds to quickly form sintered metal mounting plates of different mounting plate designs and configurations quickly and at reduced costs. This is because the molding process involves merely pressing the powdered metal in a mold and then heating the resulting molding to bond the pressed particles to one another. From the foregoing description, one skilled in the art can easily ascertain the essential characteristics of this invention, and without departing from the spirit and scope thereof, can make various changes and modifications of the invention to adapt it to various usages and conditions.

What is claimed:

1. A filter container having a filter element therein for supporting an annular filter media for filtering fluid of a machine, the filter container comprising:

a cylindrical housing having a closed end and an open end;

an annular mounting plate proximate the open end, the annular mounting plate being a molding of sintered metal the annular mounting plate supporting the annular filter media thereon within the cylindrical housing and having a central threaded opening therein for threadably coupling with a stand pipe of the machine, and an annular cover over the annular mounting plate for holding the mounting plate in the housing, the cover being fixed to the housing at a peripheral portion thereof.

2. The filter container of claim 1 wherein the annular mounting plate has a plurality of spaced apart holes therethrough which are radially spaced from the central opening.

3. The filter container of claim 1 wherein the sintered powdered metal of which the annular mounting plate is made in selected from the group consisting of iron alloys, steel alloys and aluminum alloys.

4. The filter container of claim 1 wherein the sintered powdered metal of which the annular mounting plate is made is an iron and copper mixture.

5. The filter container of claim 1 wherein the sintered powdered metal of which the annular mounting plate is made is aluminum with appropriate oxides.

6. The filter container of claim 1 wherein the sintered powdered metal of which the annular mounting plate is made is an iron, copper and steel mixture.

7. The filter container of claim 1 wherein the sintered powdered metal of which the annular mounting plate is made is a mixture of iron and carbon steel alloy.

8. The filter container of claim 1 wherein the annular mounting plate has a raised welding area thereon for attaching the annular cover thereto.

9. The filter container of claim 8 wherein the raised welding area comprises a plurality of spaced projections.

10. A filter container having a filter element therein for supporting an annular filter media for filtering fluid of a machine, the filter container comprising:

a cylindrical housing having a closed end and an open end;

an annular mounting plate proximate the open end, the annular mounting plate being a molding of sintered metal, the sintered metal being a mixture of iron and copper or a mixture of iron, copper and steel, the annular mounting plate supporting the annular filter media thereon within the cylindrical housing and having a central threaded opening therein for threadably coupling with a stand pipe of the machine, and an annular cover over the annular mounting plate for holding the mounting plate in the housing, the cover being fixed to the housing at a peripheral portion thereof.

* * * * *